US009617980B2

(12) United States Patent
Okazaki et al.

(10) Patent No.: US 9,617,980 B2
(45) Date of Patent: Apr. 11, 2017

(54) WIND POWER GENERATING SYSTEM

(71) Applicants: Sumitomo Electric Industries, Ltd., Osaka-shi (JP); Kyoto University, Kyoto-shi (JP)

(72) Inventors: Toru Okazaki, Osaka (JP); Taketsune Nakamura, Kyoto (JP)

(73) Assignees: Sumitomo Electric Industries, Ltd., Osaka-shi (JP); Kyoto University, Kyoto-shi (JP)

( * ) Notice: Subject to any disclaimer, the term of this patent is extended or adjusted under 35 U.S.C. 154(b) by 0 days.

(21) Appl. No.: 14/914,226

(22) PCT Filed: Jun. 24, 2014

(86) PCT No.: PCT/JP2014/066637
§ 371 (c)(1),
(2) Date: Feb. 24, 2016

(87) PCT Pub. No.: WO2015/029562
PCT Pub. Date: Mar. 5, 2015

(65) Prior Publication Data
US 2016/0201650 A1 Jul. 14, 2016

(30) Foreign Application Priority Data

Aug. 27, 2013 (JP) .................................. 2013-176088

(51) Int. Cl.
*F03D 9/00* (2016.01)
*H02P 9/04* (2006.01)
(Continued)

(52) U.S. Cl.
CPC ............. *F03D 9/002* (2013.01); *F03D 1/06* (2013.01); *F03D 7/028* (2013.01); *F03D 9/006* (2013.01);
(Continued)

(58) Field of Classification Search
CPC . F03D 9/002; F03D 9/006; F03D 1/06; F03D 7/028; H02P 9/00
(Continued)

(56) References Cited

U.S. PATENT DOCUMENTS 4,242,628 A * 12/1980 Mohan .................. F03D 7/0272
290/44
4,484,049 A * 11/1984 Ahner ..................... H02K 19/34
219/631

(Continued)

FOREIGN PATENT DOCUMENTS

JP 58-140486 A 8/1983
JP 2003-120505 A 4/2003
(Continued)

OTHER PUBLICATIONS

Machine translation of JP 2011/103576, obtained via espace.net.*
(Continued)

*Primary Examiner* — Tulsidas C Patel
*Assistant Examiner* — Thomas Quigley
(74) *Attorney, Agent, or Firm* — Venable LLP; Michael A. Sartori; F. Brock Riggs

(57) ABSTRACT

A wind power generating system includes: a wind mill, an induction rotating machine coupled to a rotating shaft of the wind mill; a power converting device that supplies exciting current to the induction rotating machine; a heat medium circulating structure that circulates a heat medium that receives heat generated by the induction rotating machine; a heat accumulator that accumulates heat of the heat medium; a thermal power generator that converts, into electric power, the heat of the heat medium accumulated in the heat accumulator; and an armature control unit that controls the exciting current in accordance with electric power demand of an electric power system. The armature control unit
(Continued)

performs one or both of power generation mode control in which the induction rotating machine is operated as a power generator and heat generation mode control in which the induction rotating machine is operated as a heat generator.

5 Claims, 5 Drawing Sheets

(51) Int. Cl.
| | | |
|---|---|---|
| *F03D 1/06* | (2006.01) | |
| *F03D 7/02* | (2006.01) | |
| *H02P 9/00* | (2006.01) | |
| H02P 101/15 | (2016.01) | |
| H02P 103/10 | (2016.01) | |

(52) U.S. Cl.
CPC .......... *H02P 9/00* (2013.01); *F05B 2220/602* (2013.01); *F05B 2260/20* (2013.01); *H02P 2101/15* (2015.01); *H02P 2103/10* (2015.01); *Y02E 10/723* (2013.01); *Y02E 10/725* (2013.01)

(58) Field of Classification Search
USPC ...................................................... 290/44, 55
See application file for complete search history.

(56) References Cited

U.S. PATENT DOCUMENTS

| | | | | |
|---|---|---|---|---|
| 6,198,238 B1* | 3/2001 | Edelson | .................. | H02K 3/28 |
| | | | | 318/148 |
| 8,740,543 B2* | 6/2014 | Weaver | .................. | B63B 35/44 |
| | | | | 290/44 |
| 2002/0158526 A1* | 10/2002 | Odachi | ............... | F04B 27/0895 |
| | | | | 310/75 R |
| 2008/0143111 A1* | 6/2008 | Ichinose | ................. | F03D 9/003 |
| | | | | 290/44 |
| 2010/0230966 A1* | 9/2010 | Pavlak | .................... | F03D 9/002 |
| | | | | 290/44 |
| 2010/0329652 A1* | 12/2010 | Gregg | ................... | F03D 7/0272 |
| | | | | 392/497 |
| 2011/0084566 A1* | 4/2011 | Nakamura | ............. | H02K 55/04 |
| | | | | 310/162 |
| 2012/0193924 A1* | 8/2012 | Okazaki | .................. | F03D 9/006 |
| | | | | 290/55 |
| 2014/0110938 A1* | 4/2014 | Okazaki | .................. | F03D 9/006 |
| | | | | 290/2 |
| 2014/0175802 A1* | 6/2014 | Taniyama | ............... | F03D 9/002 |
| | | | | 290/55 |
| 2015/0192109 A1* | 7/2015 | Okazaki | .................... | F03D 9/00 |
| | | | | 290/55 |

FOREIGN PATENT DOCUMENTS

| | | |
|---|---|---|
| JP | 2004-063930 A | 2/2004 |
| JP | 2011-102576 A | 5/2011 |
| JP | 2011-216325 A | 10/2011 |
| JP | 2012-043728 A | 3/2012 |

OTHER PUBLICATIONS

Machine translation of JP 2011/102576.*
International Search Report issued in International Application No. PCT/JP2014/066637, dated Sep. 16, 2014.

* cited by examiner

215 : 215b, 215r

WIND POWER GENERATING SYSTEM

TECHNICAL FIELD

The present invention relates to a wind power generating system. Particularly, the present invention relates to a wind power generating system that can generate electric power by way of both electric power and heat using wind power, that can control electric power to be generated in accordance with electric power demand, and that can effectively utilize wind energy.

BACKGROUND ART

In recent years, power generating systems using renewable energy have been drawing attention. As one of such power generating systems, a wind power generating system has been known which converts rotational energy of a wind mill into electric energy using a power generator. Moreover, recently, a wind-powered thermal power generating system has been proposed in which rotational energy of a wind mill is converted into heat energy by a heat generator employing heat generation through induction heating (eddy current) and the heat is converted into electric energy (for example, see Japanese Patent Laying-Open No. 2011-102576 (Patent Document 1) and Japanese Patent Laying-Open No. 2012-43728 (Patent Document 2)).

Further, for example, Japanese Patent Laying-Open No. 2003-120505 (Patent Document 3) and Japanese Patent Laying-Open No. 2004-63930 (Patent Document 4) propose a technique of improving power generation efficiency and a technique of effectively utilizing generated electric power in power generating systems employing renewable energy. Patent Document 3 proposes a technique of improving efficiency of a wind power generating device by driving a turbine using exhaust heat resulting from loss of a power generator coupled to a wind mill via a shaft and by recovering electric power as generated electric power from the power generator coupled to the turbine via the shaft in the wind power generating device. On the other hand, Patent Document 4 proposes a technique of effectively utilizing generated electric power as heat energy in a power generating system employing natural energy, in the following manner: an excess of electric power generated by power generating means (photovoltaic power generation or wind power generation) is converted into heat by an thermoelectric body and the heat is accumulated in heat accumulating means (electric water heater).

CITATION LIST

Patent Document

PTD 1: Japanese Patent Laying-Open No. 2011-102576
PTD 2: Japanese Patent Laying-Open No. 2012-43728
PTD 3: Japanese Patent Laying-Open No. 2003-120505
PTD 4: Japanese Patent Laying-Open No. 2004-63930

SUMMARY OF INVENTION

Technical Problem

Such a wind power generating system employs wind, which is a natural phenomenon, as a source of power and therefore generates electric power unstably. Moreover, the wind power generating system generates electric power irrespective of electric power demand and therefore cannot control electric power to be generated in accordance with the electric power demand. That is, the wind power generating system has such disadvantages that electric power cannot be generated upon high demand for electric power and therefore cannot be supplied, and that an excess of electric power is generated due to an amount of generated electric power exceeding the demand upon low demand for electric power. Accordingly, backup is required to maintain a balance between demand and supply in the electric power system, and examples of such backup are as follows: the excess of electric power is stored in a storage battery and is supplied from the storage battery in the case of shortage of electric power; and fluctuation of generated electric power is adjusted by combining the wind power generating system with a fired power generation facility. However, storage batteries are expensive and are therefore not economical. On the other hand, the fired power generation facility needs to be always on standby such that it can be started immediately, and consumes fuel and emits $CO_2$ during the standby.

The wind-powered thermal power generating system described in each of Patent Documents 1 and 2 is capable of accumulating heat, generated by a heat generator, in a heat accumulator, and is capable of generating electric power using the heat. Hence, electric power can be supplied in accordance with electric power demand without expensive storage batteries. However, such a wind-powered thermal power generating system converts the rotational energy of the wind mill into the heat energy and then converts it into electric energy, and therefore has power generation efficiency inferior to those of conventional wind power generating systems in each of which rotational energy of a wind mill is directly converted to electric energy. Moreover, it is necessary to design the power generator included therein from scratch, which may result in increase of cost.

On the other hand, the technique described in Japanese Patent Laying-Open No. 2003-120505 is directed to increasing power generation efficiency of the wind power generating device by generating electric power using the exhaust heat resulting from loss of the power generator and by recovering the generated electric power. Moreover, the technique described in Japanese Patent Laying-Open No. 2004-63930 is directed to effectively utilizing generated electric power as heat energy by converting an excess of electric power, which has been conventionally dumped, into heat, storing the heat, and utilizing it as the heat. However, none of the techniques achieves stable electric power supply and contributes to stabilization in electric power system.

The present invention has been made in view of the circumstances described above, and has one object to provide a wind power generating system that can generate electric power by way of both electric power and heat using wind power, that can control electric power to be generated in accordance with electric power demand, and that can effectively utilize wind energy.

Solution to Problem

A wind power generating system of the present application includes a wind mill, an induction rotating machine, a power converting device, a heat medium circulating structure, a heat accumulator, a thermal power generator, and an armature control unit. The induction rotating machine is coupled to a rotating shaft of the wind mill. The power converting device is configured to supply exciting current to the induction rotating machine. The heat medium circulating structure is configured to circulate a heat medium to receive heat generated by the induction rotating machine. The heat accumulator is configured to accumulate heat of the heat medium circulating in the heat medium circulating structure. The thermal power generator is configured to convert, into electric power, the heat of the heat medium accumulated in the heat accumulator. The armature control unit is configured to control the exciting current in accordance with electric power demand of an electric power system. The armature control unit is configured to perform one or both of power generation mode control and heat generation mode control, the induction rotating machine being operated as a power generator in the power generation mode control by controlling to supply reactive current from the electric power system as the exciting current, the induction rotating machine being operated as a heat generator in the heat generation mode control by controlling to supply, as the exciting current, torque current causing slip that generates load torque.

Advantageous Effects of Invention

The wind power generating system can generate electric power by way of both electric power and heat using wind power, can control electric power to be generated in accordance with electric power demand, and can effectively utilize wind energy.

DESCRIPTION OF EMBODIMENTS

Figure 1:
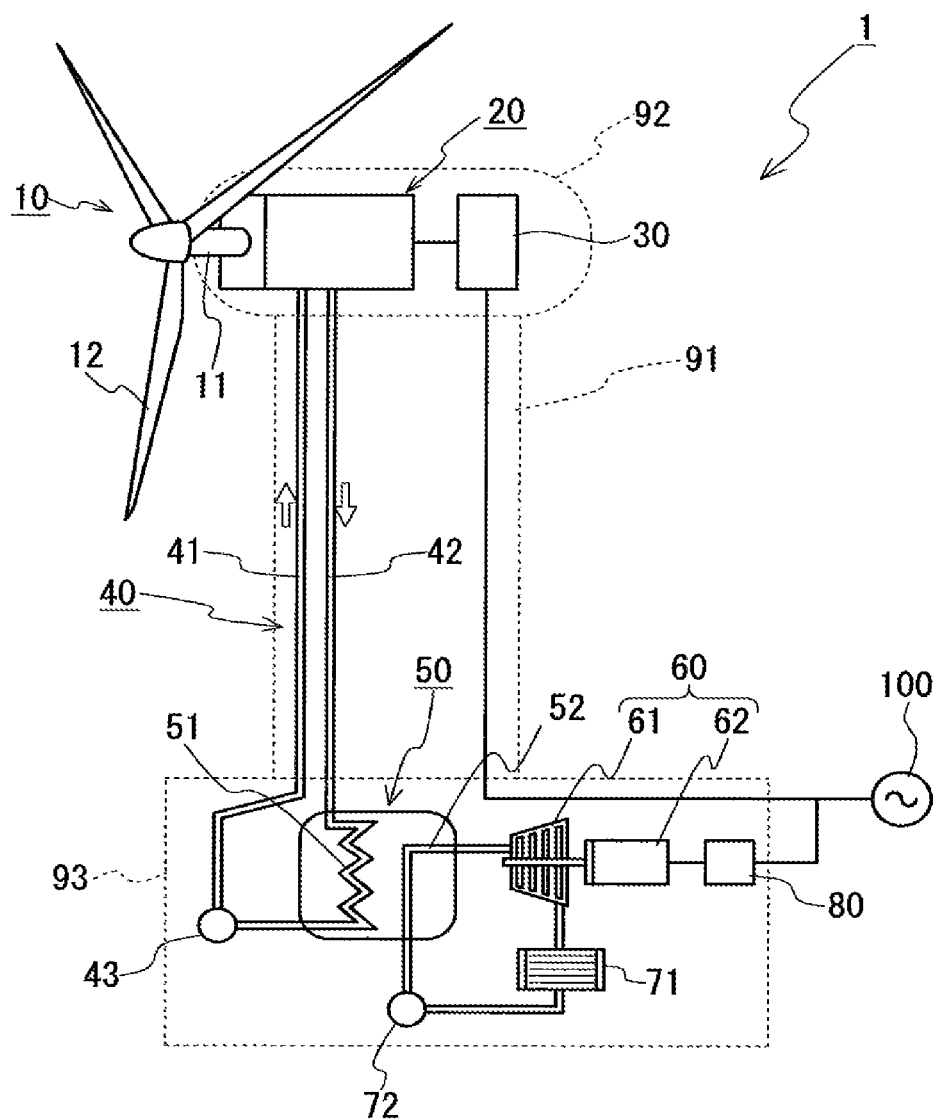
FIG. 1 is a schematic view showing an exemplary entire configuration of a wind power generating system of the present invention.

The present inventors conceived to employ an existing induction rotating machine (induction generator) in a wind power generating system and contrive an excitation method of the induction rotating machine in order to operate one induction rotating machine as a normal power generator and a heat generator. Based on this idea, the present inventors found that electric power to be generated can be controlled in accordance with electric power demand and wind energy can be utilized effectively at maximum by using the induction rotating machine as a power generator or a heat generator in accordance with electric power demand, thus completing the wind power generating system of the present application.

DESCRIPTION OF EMBODIMENTS OF THE PRESENT INVENTION

First, embodiments of the present invention are listed and described.

(1) A wind power generating system according to an embodiment includes a wind mill, an induction rotating machine, a power converting device, a heat medium circulating structure, a heat accumulator, a thermal power generator, and an armature control unit. The induction rotating machine is coupled to a rotating shaft of the wind mill. The power converting device is configured to supply exciting current to the induction rotating machine. The heat medium circulating structure is configured to circulate a heat medium to receive heat generated by the induction rotating machine. The heat accumulator is configured to accumulate heat of the heat medium circulating in the heat medium circulating structure. The thermal power generator is configured to convert, into electric power, the heat of the heat medium accumulated in the heat accumulator. The armature control unit is configured to control the exciting current in accordance with electric power demand of an electric power system. The armature control unit is configured to perform one or both of power generation mode control and heat generation mode control, the induction rotating machine being operated as a power generator in the power generation mode control by controlling to supply reactive current from the electric power system as the exciting current, the induction rotating machine being operated as a heat generator in the heat generation mode control by controlling to supply, as the exciting current, torque current causing slip that generates load torque.

According to the wind power generating system, the induction rotating machine can be operated as a power generator, a heat generator, or both by the armature control unit, thereby attaining stable electric power supply. For example, when the electric power demand of the electric power system is at peak and the wind mill is being rotated by receiving wind, the induction rotating machine is operated as a normal power generator, whereby electric power can be supplied from the induction rotating machine. By operating the induction rotating machine as a power generator, the rotational energy of the wind mill is directly converted into electric energy as with an induction generator used in a conventional wind power generating system, thereby attaining higher power generation efficiency and a larger amount of generated electric power than those of the wind-powered thermal power generating system. On the other hand, when the electric power demand of the electric power system is off peak and the wind mill is being rotated by receiving wind, the induction rotating machine is operated as a heat generator, with the result that heat generated by the induction rotating machine can be accumulated in the heat accumulator via the heat medium circulating structure.

Here, in the wind power generating system of the embodiment, the exciting current to the induction rotating machine (induction generator) is controlled in a manner different from the conventional control, whereby load torque hindering rotation of the induction rotating machine is forcibly provided to increase the amount of generated heat. Specifically, for example, by applying direct current as the exciting current although reactive current (commercial three-phase alternating current) is supposed to be applied from the electric power system (commercial power source) during the normal state (power generation mode), the same situation as that upon starting the induction rotating machine arises, thereby providing load torque as large as the starting torque.

Moreover, when the induction rotating machine is operated also as a power generator to directly obtain electric power, the commercial three-phase alternating current and the direct current can be superimposed and applied. Furthermore, when the electric power demand of the electric power system is at peak but the wind mill is not being rotated, the thermal power generator (for example, a turbine generator) can generate electric power using the heat accumulated in the heat accumulator, whereby electric power can be supplied from the thermal power generator. Moreover, fluctuation of electric power generated by the induction rotating machine can be adjusted by the thermal power generator.

That is, in the wind power generating system of the embodiment, the induction rotating machine is operated as a power generator with high power generation efficiency when electric power is required, thereby attaining efficient power generation. On the other hand, when electric power is not required, the induction rotating machine can be operated as a heat generator and heat can be accumulated in the heat accumulator. Then, when electric power becomes required, the thermal power generator can generate electric power using the heat accumulated in the heat accumulator. Therefore, the wind power generating system of the embodiment can control electric power to be generated in accordance with the electric power demand, with the result that wind energy can be utilized effectively at maximum.

Moreover, in the wind power generating system of the embodiment, by supplying the induction rotating machine with exciting current including a reactive current component and a torque current component, the induction rotating machine can also be operated as both a power generator and a heat generator. Accordingly, the amount of generated electric power and the amount of generated heat of the induction rotating machine can be also controlled. For example, when electric power is not required so much, part of the rotational energy of the wind mill can be obtained as electric energy and the rest can be obtained as heat energy by the induction rotating machine.

In the meanwhile, in the conventional wind power generating system, an output more than the capacity (rated output) of the power generator cannot be obtained. When exceeding the rated wind speed, the wind mill is controlled to miss the wind to some extent by way of pitch control or the like. That is, in the case of strong wind, wind energy will be missed. On the other hand, in the wind power generating system of the embodiment, the induction the rotating machine can be operated as a heat generator while operating the induction rotating machine as a power generator, and both generation of electric power and generation of heat are performed by the induction rotating machine in the case of strong wind, thereby obtaining an output more than the rated output for power generator. Therefore, energy can be recovered at maximum without missing the wind energy in vain. Moreover, a range of wind speed for use becomes wide, with the result that cutout wind speed can also be made high.

Furthermore, in the wind power generating system of the embodiment, the induction rotating machine having generated the heat can be cooled by circulating the heat medium by the heat medium circulating structure, thereby preventing the induction rotating machine from being burned out.

It should be noted that the induction rotating machine is also referred to as "induction machine", which is a general term of induction generator and induction motor. In the wind power generating system of the embodiment, an existing technique of induction generator (induction motor) is used for the induction rotating machine, whereby the induction rotating machine can be constructed inexpensively and simply. One example of the induction rotating machine is a canned motor. Generally, such an induction rotating machine includes: a field magnet having a field core and a field conductor disposed therearound; and an armature that is disposed with a space interposed between the armature and the field magnet and that has an armature core having a salient pole facing the field magnet and an armature coil wound around the salient pole. The induction rotating machine has such a structure that one of the field magnet and the armature serves as a rotor coupled to the rotating shaft of the wind mill and the other serves as a stator. Moreover, the induction rotating machine includes: a primary side armature coil externally supplied with the exciting current; and a secondary side conductor (such as a squirrel cage conductor) not electrically connected to outside and having both ends short-circuited. Here, since this secondary side substantially acts as the field magnet, the secondary side will be referred to as "field magnet" and the core and conductor of the secondary side will be referred to as "field core" and "field conductor" respectively.

(2) As one mode of the wind power generating system of the embodiment, there can be employed such a configuration that in the heat generation mode control, the armature control unit controls the torque current as direct current or alternating current.

Figure 7:
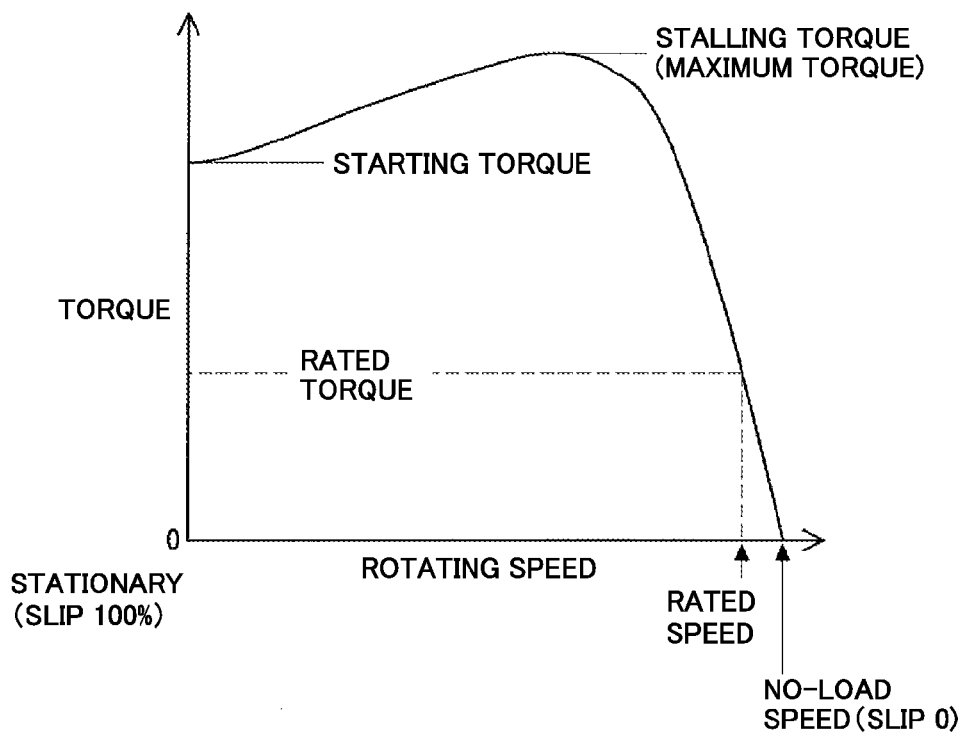
FIG. 7 is an explanatory illustration showing an exemplary speed-torque characteristic of a typical induction rotating machine.

FIG. 7 shows an exemplary speed-torque characteristic of a typical induction rotating machine, and the horizontal axis represents rotating speed and the vertical axis represents torque. As shown in FIG. 7, in the induction rotating machine, normally, starting torque is larger than rated torque when outputting rated output. Moreover, the output of the induction rotating machine is proportional to the product of rotating speed (the number of rotations) and torque. When the induction rotating machine (rotor) is rotated at the rated rotating speed (rated number of rotations) according to rotation of the wind mill and the exciting current is controlled by the armature control unit to supply the direct current as the torque current, the rotating speed of a magnetic field generated in the armature becomes 0, thereby causing a phenomenon having the same principle as a phenomenon called "dynamic brake". Assuming that the rotor is stationary and the stator is relatively rotated, slip becomes 100%, which is the same state as the state upon starting the induction rotating machine. Accordingly, load torque as large as the starting torque is obtained and work (output) thereof is consumed by generation of heat. That is, by applying the direct current to the induction rotating machine (armature coil), torque as large as the starting torque can be obtained and therefore loss of the induction rotating machine is increased, thereby increasing the amount of generated heat. It should be noted that in this case, the induction rotating machine is operated with torque larger than the rated torque, thus obtaining work (output) larger than the rated output for power generator. Moreover, not only the direct current but alternating current can be applied as the torque current as long as the torque current causes slip that generates the load torque larger than the rated torque.

(3) As one mode of the wind power generating system of the embodiment, there can be employed such a configuration that in the heat generation mode control, the armature control unit controls the torque current as alternating current having a frequency allowing for rated torque to stalling torque.

As shown in FIG. 7, torques from the rated torque to the stalling torque are larger than the rated torque. Particularly, the stalling torque is the maximum torque that can be output by the induction rotating machine, and is larger than the rated torque and the starting torque. Further, when the induction rotating machine (rotor) is rotated at the rated rotating speed (rated number of rotations) according to rotation of the wind mill, the exciting current is controlled by the armature control unit to supply, as the torque current, alternating current having a frequency allowing for slip that causes the load torque to be as large as the rated torque to the stalling torque, thereby obtaining work (output) larger than the rated torque. Particularly, when supplying alternating current having a frequency allowing for the stalling torque is supplied, larger work (output) can be obtained. Specifically, by controlling as the alternating current having the frequency allowing for the slip that causes the stalling torque and adjusting the rotating speed of the magnetic field generated in the armature, load torque as large as the stalling torque is obtained, with the result that work (output) thereof is consumed by generation of heat. Accordingly, loss of the induction rotating machine is increased further, thereby further increasing the amount of generated heat.

(4) As one mode of the wind power generating system of the embodiment, there can be employed such a configuration that the wind power generating system includes a heat insulation container that contains the induction rotating machine, wherein the heat medium circulating structure circulates the heat medium in the heat insulation container.

According to the configuration, the heat generated by the induction rotating machine can be recovered by the heat medium without missing the heat. Moreover, even when the field magnet generating the heat serves as a rotor, the heat generated by the field magnet can be readily transferred to the heat medium.

(5) As one mode of the wind power generating system of the embodiment, there can be employed such a configuration that the wind power generating system includes a power control unit that controls electric power to be generated by the thermal power generator, in accordance with the electric power demand of the electric power system.

According to the configuration, when the electric power demand of the electric power system is at peak and the wind mill is not being rotated, electric power is supplied from the thermal power generator, whereas when the wind mill is being rotated but a larger amount of electric power is required to be generated, electric power can be simultaneously supplied from the induction rotating machine and the thermal power generator. In other words, by adding the electric power generated by the thermal power generator, it is possible to supply a larger amount of electric power than the electric power generated by the induction rotating machine serving as a power generator. Moreover, when the electric power demand of the electric power system is off peak, the power generation by the thermal power generator can be stopped to enter into stand-by with heat being accumulated.

Details of Embodiments of the Present Invention

The following describes specific examples of the embodiments of the present invention with reference to figures. It should be noted that the same or corresponding portions are given the same reference characters and are not described repeatedly.

First Embodiment

Field Magnet=Rotor (Inner Side), Armature=Stator (Outer Side)

<Entire Configuration of Wind Power Generating System>

With reference to FIG. 1 to FIG. 5, a wind power generating system according to a first embodiment will be described. A wind power generating system 1 shown in FIG. 1 includes a wind mill 10, an induction rotating machine 20, a power converting device (inverter) 30, a heat medium circulating structure 40, a heat accumulator 50, and a thermal power generator 60. Induction rotating machine 20 is contained in a heat insulation container 250 (see FIG. 2). In this example, as shown in FIG. 1, wind mill 10 is attached to a nacelle 92 disposed at the upper portion of a tower 91, and induction rotating machine 20 and power converting device 30 are contained in nacelle 92. Moreover, heat accumulator 50 and thermal power generator 60 are disposed in a building 93 built at the lower portion (base) of tower 91. Induction rotating machine 20 and thermal power generator 60 are connected and interconnected to an electric power system (commercial power) 100.

(Wind Mill)

Wind mill 10 has such a structure that three blades 12 are attached to a rotating shaft 11 radially with respect to rotating shaft 11, which extends horizontally. A rotation detector 13 (see FIG. 2) is attached to rotating shaft 11 of wind mill 10 to detect the rotating speed (number of rotations).

(Induction Rotating Machine)

Figure 2:
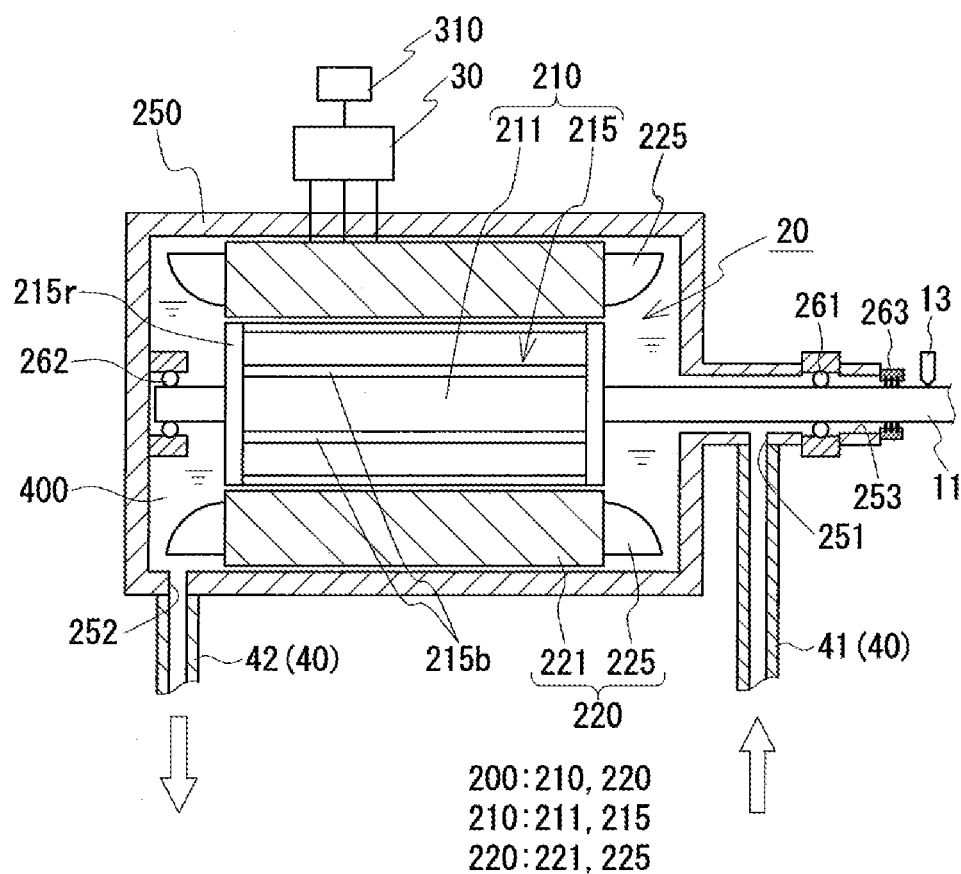
FIG. 2 is a schematic view showing an exemplary configuration of an induction rotating machine in a first embodiment.

Induction rotating machine 20 is constructed using an existing induction machine (canned motor used for a high-temperature pump). In this example, induction rotating machine 20 is a squirrel cage three-phase induction machine (power generator or motor), and includes a field magnet 210, and an armature 220 disposed with a space between field magnet 210 and armature 220 as shown in FIG. 2. Field magnet 210 is a rotor connected to rotating shaft 11 of wind mill 10 and armature 220 is a stator. Specifically, field magnet (rotor) 210 includes: a field core 211 connected to rotating shaft 11 of wind mill 10; and a field conductor 215 disposed therearound. Field magnet 210 is rotated according to rotation of wind mill 10. Moreover, armature (stator) 220 is disposed outwardly of field magnet 210 with a space interposed therebetween, and includes: an armature core 221 having a salient pole facing field magnet 210; and an armature coil 225 wound around the salient pole. In this example, induction rotating machine 20 (field magnet 210) is directly coupled to rotating shaft 11 of wind mill 10; however, induction rotating machine 20 may be coupled to an output shaft of a speed increasing gear (not shown) via the speed increasing gear. When no speed increasing gear is used, a trouble accompanied by the speed increasing gear can be avoided.

Induction rotating machine 20 is connected to electric power system 100 via power converting device 30. Accordingly, induction rotating machine 20 can obtain exciting current from electric power system 100 to generate electric power, and can supply the generated electric power to electric power system 100.

In field magnet (rotor) 210, a conductor is disposed in the form of a squirrel cage around field core 211 having a cylindrical shape, and this squirrel cage conductor constitutes field conductor 215. This squirrel cage conductor (field conductor 215) is formed in the following manner: conductor bars 215*b* are provided in a multiplicity of slots provided at the outer circumference of field core 211 with a space interposed therebetween; and conductor end rings 215*r* are provided at the both ends of field core 211 to short-circuit these conductor bars 215*b*. Such a squirrel cage rotor has a very simple structure and therefore is less likely to have a failure, advantageously. In this example, the squirrel cage rotor using the squirrel cage conductor for field conductor 215 is employed; however, a coil type rotor may be employed which uses a coil in which a conductor is wound as field conductor 215 with the both ends thereof being short-circuited. Field core 211 can be formed by providing electromagnetic steel sheets such as silicon steel sheets on each other, for example. Field conductor 215 can be formed using copper or aluminum, for example.

Figure 3:
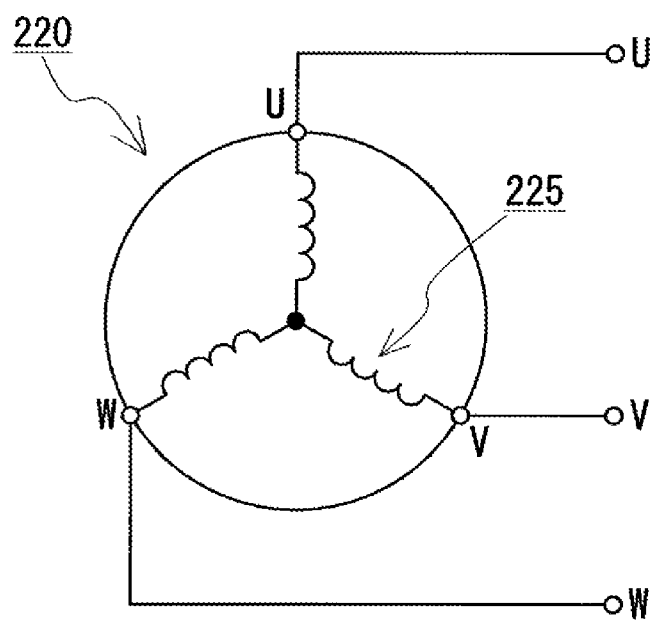
FIG. 3 is an explanatory illustration showing exemplary connection of an armature coil in an armature.

In armature (stator) 220, a three-phase armature coil 225 (U phase, V phase, and W phase) is wound in a distributed winding manner around the salient pole of armature core 221. In this example, as shown in FIG. 3, the respective phases of armature coil 225 are connected to one another in the form of Y connection. Moreover, in this example, armature core 221 has a structure including: a yoke portion having a cylindrical shape; and the salient pole inwardly projecting from this yoke portion toward field magnet 210. Armature coil 225 is in the form of distributed winding, but can be also in the form of concentrated winding. Turning back to FIG. 2, armature core 221 can be formed by providing electromagnetic steel sheets such as silicon steel sheets on each other, for example. In this example, it is preferable to use, for example, a superheat-resistant coil having a ceramic insulating layer because armature coil 225 is used under a high temperature environment such as inside of heat medium 400 having a high temperature. As such a superheat-resistant coil, there is known a superheat-resistant coil having heat resistance allowing for use at up to 400° C. In the case where the temperature in use is low, an enamel wire such as a polyamidoimide copper wire or a polyimide copper wire can be also used.

(Heat Insulation Container)

Heat insulation container 250 contains induction rotating machine 20 (field magnet (rotor) 210 and armature (stator) 220). Heat insulation container 250 can be constructed by providing a heat insulating material around a metal container, for example. Examples of such a heat insulating material include rock wool, glass wool, foamed plastics, bricks, ceramics, or composite materials formed of appropriate combinations of these materials.

Heat insulation container 250 is provided with a shaft insertion opening 253 in which rotating shaft 11 is inserted, and rotating shaft 11 is coupled to field magnet (rotor) 210 of induction rotating machine 20 via shaft insertion opening 253. In this example, a through hole is formed along the central axis of field core 211. Rotating shaft 11 is inserted into the through hole and field magnet 210 is fixed to rotating shaft 11. Moreover, in heat insulation container 250, bearings 261, 262 are provided at two locations, i.e., the side at which rotating shaft 11 is inserted and the side opposite thereto. Rotating shaft 11 is rotatably supported by bearings 261, 262.

Moreover, heat insulation container 250 is provided with an inlet portion 251 via which heat medium 400 is supplied and an outlet portion 252 via which heat medium 400 is discharged, and heat medium 400 is circulated therein to receive heat generated by induction rotating machine 20. In this example, inlet portion 251 is provided at the side of heat insulation container 250 at which rotating shaft 11 is inserted, and outlet portion 252 is provided at the opposite side. A supply pipe 41 and a discharge pipe 42 of heat medium circulating structure 40 are respectively connected to inlet portion 251 and outlet portion 252. Moreover, a shaft sealing portion 263 is disposed at shaft insertion opening 253 of heat insulation container 250. Here, heat medium 400 supplied from inlet portion 251 into heat insulation container 250 preferably has a temperature of not more than 100° C. (for example, normal temperature). Accordingly, induction rotating machine 20 having generated the heat can be cooled effectively. Moreover, with the temperature being not more than 100° C., it is sufficient that shaft sealing portion 263 disposed in the vicinity of inlet portion 251 has a heat resistance of about 100° C., so that a commercially available fluid seal can be employed for shaft sealing portion 263. Heat medium 400 having been heated to a predetermined temperature (for example, 200° C. to 350° C.) by receiving the heat generated by induction rotating machine 20 is discharged from outlet portion 252 to outside heat insulation container 250.

(Heat Medium)

Examples of heat medium 400 include water, oil, molten salt, and the like. In the case where water is used for heat medium 400, internal pressure of heat insulation container 250 is increased when heat medium 400 is heated to a temperature of more than 100° C. above which water is turned into steam. On the other hand, in the case where oil or molten salt having a boiling point of more than 100° C. at an atmospheric pressure is used for heat medium 400, the internal pressure of heat insulation container 250 can be suppressed from being increased even when heat medium 400 is heated to a temperature of more than 100° C. Heat medium 400 preferably has a boiling point of more than 200° C. at the atmospheric pressure, and more preferably has a boiling point of more than 350° C. Particularly, heat medium 400 is preferably liquid in a range of temperature in use (for example, normal temperature to 350° C.). In this example, oil having a boiling point of more than 350° C. at the atmospheric pressure is used for heat medium 400, and heat medium 400 can be circulated in heat insulation container 250 and can be heated to about 350° C. by induction rotating machine 20.

(Power Converting Device, Armature Control Unit)

Power converting device 30 supplies exciting current to induction rotating machine 20 (armature coil 225). An armature control unit 310 (see FIG. 2) is connected to power converting device 30 to control the exciting current to induction rotating machine 20 (armature coil 225) in accordance with electric power demand of electric power system 100. Armature control unit 310 performs one or both of power generation mode control and heat generation mode control. In the power generation mode control, induction rotating machine 20 is operated as a power generator by controlling to supply reactive current from electric power system 100 as the exciting current. In the heat generation mode control, induction rotating machine 20 is operated as a heat generator by controlling to supply, as the exciting current, torque current allowing for slip that causes load torque.

In the heat generation mode control, the rotating speed of the magnetic field generated in armature 220 is controlled by controlling the exciting current to induction rotating machine 20 (armature coil 225) so as to cause the slip that generates the load torque when the rotor (here, field magnet 210) is rotated according to rotation of wind mill 10. Accordingly, the load torque is forcibly provided to the rotor and induced current according to the load torque therefore flows in field conductor 215 of field magnet 210, with the result that field conductor 215 generates heat. In other words, work (output) by the load torque hindering rotation of induction rotating machine 20 (rotor) is converted into heat as loss. It should be noted that the value of the torque current (the magnitude of the current) to armature coil 225 may be appropriately determined in accordance with the specification of induction rotating machine 20 so as to obtain predetermined load torque, and the value of the torque current can be set at the same current value as rated current (designed value), for example. In principle, the load torque is increased as the value of the torque current becomes larger; however, too a large value of torque current leads to magnetic saturation of armature core 221, with the result that the load torque tops out. The current value of the torque can be not less than 50% and not more than 110% of the rated current value, for example.

Figure 4:
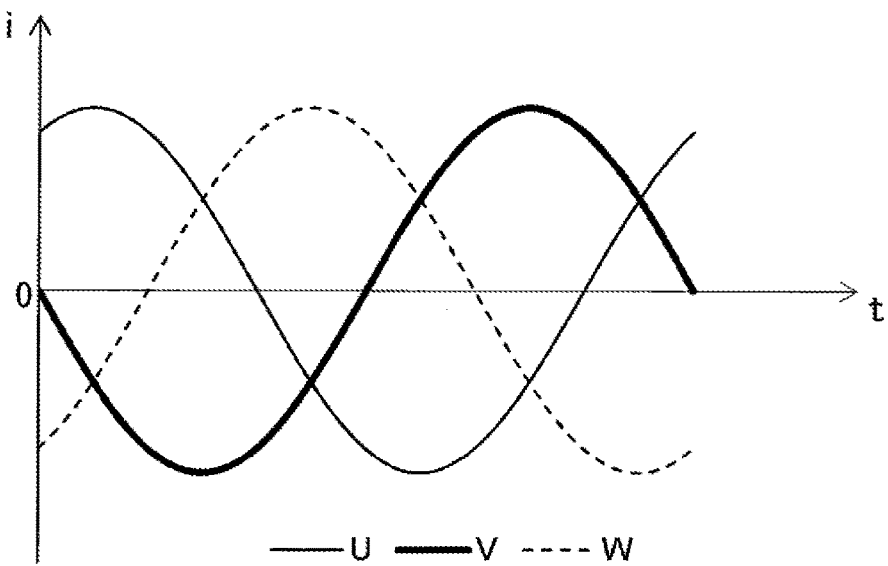
FIG. 4 is an explanatory illustration showing exemplary exciting current in the case where the induction rotating machine is operated as a power generator.

For example, induction rotating machine 20 can be operated as a normal power generator by supplying the reactive current (three-phase alternating current) such as one shown in FIG. 4 as the exciting current from electric power system 100 while wind mill 10 is rotated and induction rotating machine 20 is rotated. It should be noted that the horizontal axis of FIG. 4 represents time (t) and the vertical axis represents current value (i). Regarding the horizontal axis and the vertical axis, the same applies to those in FIG. 5 described below. On the other hand, when the torque current causing the slip that generates the load torque is supplied, loss (amount of generated heat) in induction rotating machine 20 is increased, whereby induction rotating machine 20 can be operated as a heat generator. In this example, in the heat generation mode control, the torque current is controlled as direct current, i.e., as the torque current, direct currents flow in at least two of the U phase, the V phase, and the W phase of armature coil 225, and direct current is applied between the U phase and the V phase, between the U phase and the W phase, or between the V phase and the W phase. Specifically, for example, the direct current can flow such that equal direct currents are input from two (for example, the U phase and the W phase) of the three phases and direct current resulting from the two is output from the remaining one (for example, the V phase) of the phases, or the direct current can flow such that direct current is input from any one of the three phases and direct current is output from another one of the three phases.

The following describes a principle in which induction rotating machine 20 operates as a heat generator in this case. For example, when the direct current is applied as the torque current from power converting device 30 by armature control unit 310 while field magnet (rotor) 210 is being rotated at a rated rotating speed (rated number of rotations) according to rotation of wind mill 10, load torque as large as the starting torque is obtained. Then, induced current flows in field conductor 215 of field magnet 210 and work (output) thereof is consumed as generation of heat in field conductor 215. Here, as described above with reference to FIG. 7, the starting torque is generally larger than the rated torque, so that work (output) larger than the rated output of induction rotating machine 20 can be obtained, thus resulting in a large amount of generated heat.

Figure 5:
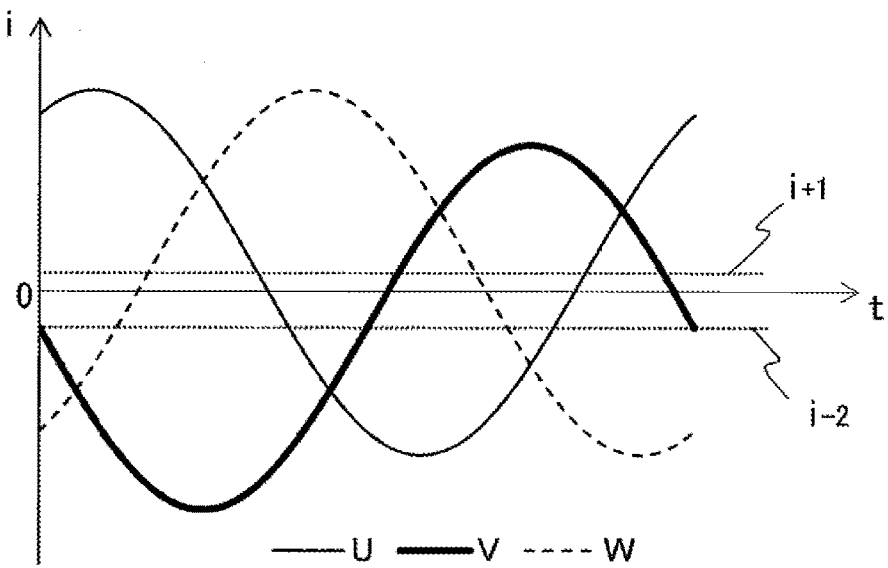
FIG. 5 is an explanatory illustration showing an exemplary exciting current in the case where the induction rotating machine is operated as both a power generator and a heat generator.

Moreover, induction rotating machine 20 can also be operated as both a power generator and a heat generator by armature control unit 310 performing both the power generation mode control and the heat generation mode control. In this case, the amount of generated power and the amount of generated heat of induction rotating machine 20 can be controlled by supplying exciting current including a reactive current component and a torque current component and by adjusting a ratio of the reactive current component and the torque current component. For example, as shown in FIG. 5, the torque current (direct current) can be superimposed on the reactive current (three-phase alternating current) Assuming that the rated current value is 10, FIG. 5 shows exciting current in which direct current of 1 ("i+1" in the figure) is superimposed on the U phase and the W phase, and exciting current in which direct current of −2 ("i−2" in the figure) is superimposed on the V phase. As the torque current component is increased, the ratio of the amount of generated heat of induction rotating machine 20 is increased.

(Heat Medium Circulating Structure)

Heat medium circulating structure 40 circulates, in heat insulation container 250, heat medium 400 to receive the heat generated by induction rotating machine 20 (see FIG. 1 and FIG. 2). In this example, heat medium circulating structure 40 includes: supply pipe 41 that has one end connected to inlet portion 251 of heat insulation container 250 and that supplies heat medium 400 into heat insulation container 250; discharge pipe 42 that has one end connected to outlet portion 252 of heat insulation container 250 and that discharges heat medium 400 to outside heat insulation container 250; and a circulating pump 43 provided at supply pipe 41. Moreover, each of the other end of supply pipe 41 and the other end of discharge pipe 42 is connected to heat accumulator 50. Heat medium circulating structure 40 uses circulating pump 43 to circulate heat medium 400 between induction rotating machine 20 (heat insulation container 250) and heat accumulator 50, thereby circulating heat medium 400 in heat insulation container 250. Here, it is preferable to adjust the flow rate of heat medium 400 using circulating pump 43 in accordance with the temperature of heat medium 400 heated by the heat generated by induction rotating machine 20. Specifically, the flow rate of heat medium 400 is increased when heat medium 400 has a temperature higher than a predetermined temperature, whereas the flow rate is decreased when heat medium 400 has a temperature lower than the predetermined temperature. Accordingly, induction rotating machine 20 can be maintained in the range of temperature for use.

Heat medium 400 heated by induction rotating machine 20 is provided to heat accumulator 50 through discharge pipe 42. In this example, heat accumulator 50 is filled with a heat accumulating material and a first heat exchange pipe 51 and a second heat exchange pipe 52 are provided therein, so that heat accumulator 50 has a heat exchange function. First heat exchange pipe 51 has one end connected to discharge pipe 42 and heat medium 400 (for example, oil) having been heated to the predetermined temperature is circulated in first heat exchange pipe 51 to attain heat exchange between heat medium 400 and the heat accumulating material, with the result that the heat of heat medium 400 is accumulated in the heat accumulating material. On the other hand, a secondary heat medium (for example, water) is circulated in second heat exchange pipe 52 to attain heat exchange between the heat accumulating material and the secondary heat medium, with the result that the secondary heat medium circulating in second heat exchange pipe 52 is turned into steam. The steam (for example, high-temperature, high-pressure steam) of the secondary heat medium thus generated is provided to thermal power generator 60 via second heat exchange pipe 52. That is, heat accumulator 50 also has a function as a heat exchanger. For the heat accumulating material, a latent heat accumulating material or a sensible heat accumulating material can be used, or they may be used in combination. Generally, the latent heat accumulating material involves phase change between solid and liquid, and allows for higher heat accumulation density than that of the sensible heat accumulating material. Here, supply pipe 41 is connected to the other end of first heat exchange pipe 51. Heat medium 400 cooled as a result of the heat exchange is provided to induction rotating machine 20 (heat insulation container 250) again through supply pipe 41 by circulating pump 43.

(Thermal Power Generator, Power Control Unit)

Thermal power generator 60 converts, into electric power, the heat of heat medium 400 heated by induction rotating machine 20. In this example, the heat accumulated in heat accumulator 50 is converted into electric power. Thermal power generator 60 shown in FIG. 1 has a configuration in combination of a steam turbine 61 and a power generator 62, can generate electric power due to power generator 62 being driven with steam turbine 61 being rotated by steam supplied from heat accumulator 50, and can supply the generated electric power to electric power system 100. Moreover, a power control unit 80 is connected to thermal power generator 60 so as to control electric power to be generated by thermal power generator 60 in accordance with electric power demand of electric power system 100.

The steam of the secondary heat medium discharged from thermal power generator 60 (steam turbine 61) is cooled and is turned into liquid by a steam condenser 71, and is then supplied to heat accumulator 50 (second heat exchange pipe 52) by circulating pump 72. Accordingly, the secondary heat medium is circulated between heat accumulator 50 and thermal power generator 60.

<Effect of Wind Power Generating System>

Wind power generating system 1 of the first embodiment as described above exhibits the following effects.

(1) Since induction rotating machine 20 can be operated by armature control unit 310 as a power generator, a heat generator, or both, electric power to be generated can be controlled in accordance with electric power demand, whereby wind energy can be utilized effectively at maximum. For example, when the electric power demand of electric power system 100 is at peak and wind mill 10 is being rotated, induction rotating machine 20 is operated as a power generator with high power generation efficiency (power generation mode control), whereby electric power can be supplied from induction rotating machine 20. On the other hand, when the electric power demand of electric power system 100 is off peak and wind mill 10 is being rotated, induction rotating machine 20 is operated as a heat generator (heat generation mode control), whereby the heat generated by induction rotating machine 20 can be accumulated in heat accumulator 50 via heat medium circulating structure 40. Moreover, when the electric power demand of electric power system 100 is at peak but wind mill 10 is not being rotated, thermal power generator 60 generates electric power using the heat accumulated in heat accumulator 50, whereby electric power can be supplied from thermal power generator 60. Therefore, according to wind power generating system 1, stable electric power supply can be attained without backup such as storage batteries or fired power generation facilities.

(2) In the case where induction rotating machine 20 is operated as both a power generator and a heat generator, the amount of generated power and the amount of generated heat of induction rotating machine 20 can be also controlled. Accordingly, when electric power is not required so much, part of the rotational energy of wind mill 10 can be obtained as electric energy and the rest can be obtained as heat energy by induction rotating machine 20. Moreover, by also operating induction rotating machine 20 as a heat generator while operating induction rotating machine 20 as a power generator, both generation of electric power and generation of heat are performed by induction rotating machine 20 in the case of strong wind, thereby obtaining an output more than the rated output for power generator. Therefore, energy can be recovered at maximum without missing wind energy in vain. Moreover, a range of wind speed for use becomes wide, with the result that cutout wind speed can also be made high.

(3) When the electric power demand of electric power system 100 is at peak and wind mill 10 is not being rotated, electric power is supplied from thermal power generator 60, whereas when wind mill 10 is being rotated but a larger amount of electric power is required to be generated, electric power can be simultaneously supplied from induction rotating machine 20 and thermal power generator 60.

(4) In addition, an existing technique of induction machine can be used for the induction rotating machine and therefore the induction rotating machine can be constructed inexpensively and simply.

Second Embodiment

Field Magnet=Rotor (Inner Side), Armature=Stator (Outer Side)

In the first embodiment, it is described that in the heat generation mode control, the direct current is applied to induction rotating machine 20 (armature coil 225) as the torque current by armature control unit 310. In the second embodiment, it will be described that in the heat generation mode control, alternating current having a frequency allowing for rated torque to stalling torque is applied to induction rotating machine 20 (armature coil 225) as the torque current. Here, as a specific example, the following describes a case of controlling the torque current as alternating current having a frequency allowing for stalling torque. It should be noted that the configuration of the second embodiment is the same as the configuration of the first embodiment except that the excitation method of induction rotating machine 20 by armature control unit 310 is different from that in the first embodiment and therefore the following describes mainly the difference.

Specifically, in the heat generation mode control, armature control unit 310 is configured to control as three-phase alternating current having a predetermined frequency allowing for slip that causes the stalling torque, and to apply this to armature coil 225 as the torque current.

The following describes a principle in which induction rotating machine 20 is operated as a heat generator in this case. For example, when the alternating current having the frequency allowing for the stalling torque is applied from power converting device 30 by armature control unit 310 while field magnet (rotor) 210 is being rotated at a rated rotating speed (rated number of rotations) according to rotation of wind mill 10, load torque as large as the stalling torque is obtained. Then, induced current flows in field conductor 215 of field magnet 210 and work (output) thereof is consumed as generation of heat in field conductor 215. Here, as described above with reference to FIG. 7, the stalling torque is generally much larger than the rated torque and the starting torque, so that work (output) much larger than the rated output of induction rotating machine 20 can be obtained, thus resulting in a larger amount of generated heat.

[Modification 1: Field Magnet=Stator (Outer Side), Armature=Rotor (Inner Side)]

Described in each of the first and second embodiments is the configuration (rotating field magnet type) in which field magnet 210 serves as the rotor and armature 220 serves as the stator in induction rotating machine 20. Induction rotating machine 20 can be further modified to have a configuration (rotating armature type) in which the positional relation between field magnet 210 and armature 220 is reversed, field magnet 210 serves as the stator, and armature 220 serves as the rotor.

Figure 6:
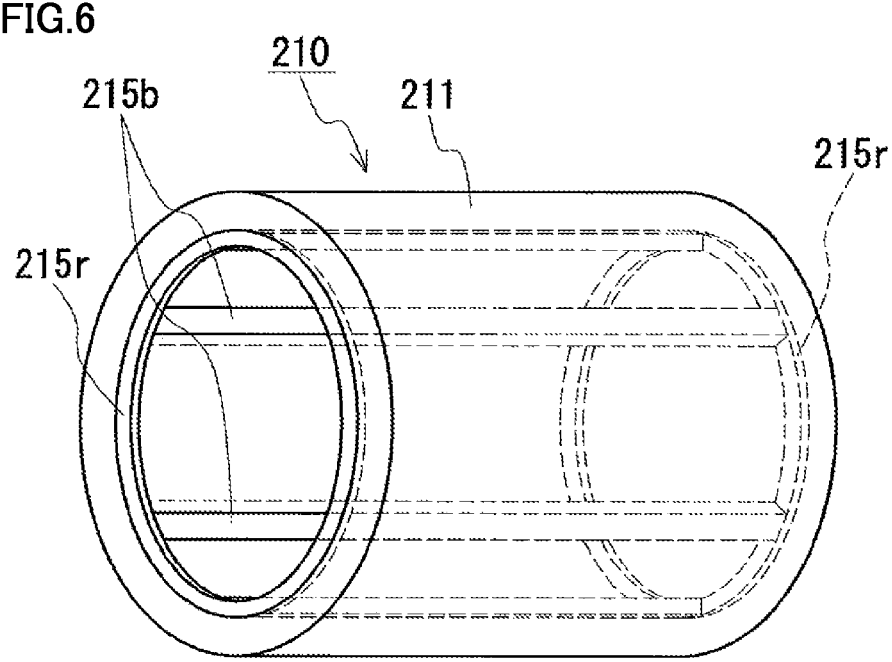
FIG. 6 is a schematic view showing a configuration of a field magnet in a modification 1.

For example, as shown in FIG. 6, in the field magnet (stator), a conductor is disposed in the form of squirrel cage at the inner circumference of field core 211 having a cylindrical shape and this squirrel cage conductor can serve as field conductor 215. This squirrel cage conductor (field conductor 215) is formed in the following manner: conductor bars 215b are provided in a multiplicity of slots provided at the inner circumference of field core 211 with a space interposed therebetween; and conductor end rings 215r are provided at the both ends of field core 211 to short-circuit these conductor bars 215b. On the other hand, the armature (rotor) is disposed inside field magnet 210 with a space interposed therebetween and is coupled to the rotating shaft of the wind mill. Specifically, there can be employed such a structure that the armature core is coupled to the rotating shaft of the wind mill and the armature coil is wound around the salient pole of the armature core projecting outwardly toward the field magnet. The armature coil can be in the form of three-phase distributed winding as with the first embodiment. Moreover, the armature coil may be supplied with the exciting current from the power converting device via a slip ring.

Also with such a configuration, when the rotor (here, the armature) is rotated according to rotation of the wind mill, the exciting current to the armature coil is controlled by the armature control unit to cause the slip that generates the load torque, with the result that induced current according to the load torque flows in the field conductor of the field magnet. As a result, the field conductor generates heat. For example, when the armature (rotor) is being rotated at the rated rotating speed (rated number of rotations) according to rotation of the wind mill and direct current is applied to the armature coil as the torque current as with the first embodiment, load torque as large as the starting torque is obtained, with the result that work (output) thereof is consumed by generation of heat of the field conductor. Alternatively, when alternating current having a frequency allowing for the stalling torque is applied to the armature coil as the torque current as with the second embodiment, load torque as large as the stalling torque is obtained, with the result that work (output) thereof is consumed by generation of heat of the field conductor.

Moreover, with this configuration, the field magnet generating the heat is the stator, so that there can be employed such a configuration that the induction rotating machine is not contained in the heat insulation container. Specifically, the field magnet is provided with a heat medium flow path by providing the field magnet with a hole in which the heat medium is circulated or by disposing a pipe at the outer circumferential surface of the field magnet to allow the heat medium to be circulated therein, and the heat medium circulating structure is constructed using this heating medium flow path, whereby heat generated by the induction rotating machine (field magnet) can be transferred to the heat medium. In this case, the heat insulation container can be omitted, thus attaining a smaller size.

[Modification 2: Field Magnet=Stator (Inner Side), Armature=Rotor (Outer Side)]

Described in each of the first and second embodiments is such a configuration (inner rotor type) that the rotor (field magnet 210) is disposed inwardly of the stator (armature 220) in the induction rotating machine. Induction rotating machine 20 can be further modified to have such a configuration (outer rotor type) in which field magnet 210 serves as the stator, armature 220 serves as the rotor, and the rotor (armature 220) is disposed outwardly of the stator (field magnet 210) without changing the positional relation between field magnet 210 and armature 220.

For example, there can be employed such a structure that the armature core is coupled to the rotating shaft to rotate the armature in conjunction with the rotating shaft of the wind mill and that the field magnet (field core) is supported in a cantilever manner by a housing such as the heat insulation container and is fixed thereto. Moreover, in this case, the armature coil may be supplied with exciting current from the power converting device via a slip ring.

[Modification 3: Field Magnet=Rotor (Outer Side), Armature=Stator (Inner Side)]

Also in the induction rotating machine of modification 1 described above, there can be employed such a configuration (outer rotor type) in which the armature serves as the stator, the field magnet serves as the rotor, and the rotor (field magnet) is disposed outwardly of the stator (armature) as with modification 2.

It should be noted that in each of the wind power generating systems of the first and second embodiments and modifications 1 to 3 described above, in the case of the configuration in which the induction rotating machine is contained in the heat insulation container and the heat medium is circulated therein, heat exchanging efficiency between field magnet 210 and heat medium 400 can be improved by providing unevenness or fins in the surface of field core 211 to increase the surface area of field magnet 210, for example. Moreover, heat medium circulating structure 40 may be used as a heat accumulator by winding a heat insulating material around supply pipe 41 or discharge pipe 42 of heat medium circulating structure 40 to provide a heat insulating function. In this case, the heat of the heat medium circulating in heat medium circulating structure 40 may be used to generate electric power by thermal power generator 60.

The embodiments disclosed herein are illustrative and non-restrictive in any respect. The scope of the present invention is defined by the terms of the claims, and is intended to include any modifications within the scope and meaning equivalent to the terms of the claims.

INDUSTRIAL APPLICABILITY

The wind power generating system of the present invention is suitably applicable to the field of power generation using renewable energy.

REFERENCE SIGNS LIST

1: wind power generating system; 10: wind mill; 11: rotating shaft; 12: blade; 13: rotation detector; 20: induction rotating machine; 210: field magnet; 211: field core; 215: field conductor; 215b: conductor bar; 215r: conductor end ring; 220: armature; 221: armature core; 225: armature coil; 250: heat insulation container; 251: inlet portion; 252: outlet portion; 253: shaft insertion opening; 261, 262: bearing; 263: shaft sealing portion; 30: power converting device;

310: armature control unit; 40: heat medium circulating structure; 400: heat medium; 41: supply pipe; 42: discharge pipe; 43: circulating pump; 50: heat accumulator; 51: first heat exchange pipe; 52: second heat exchange pipe; 60: thermal power generator; 61: steam turbine; 62: power generator; 71: steam condenser; 72: circulating pump; 80: power control unit; 91: tower; 92: nacelle; 93: building; 100: electric power system (commercial power source).

The invention claimed is:

1. A wind power generating system comprising:
    a wind mill,
    an induction rotating machine coupled to a rotating shaft of the wind mill;
    a power converting device configured to supply exciting current to the induction rotating machine;
    a heat medium circulating structure configured to circulate a heat medium to receive heat generated by the induction rotating machine;
    a heat accumulator configured to accumulate heat of the heat medium circulating in the heat medium circulating structure;
    a thermal power generator configured to convert, into electric power, the heat of the heat medium accumulated in the heat accumulator; and
    an armature control unit configured to control the exciting current in accordance with electric power demand of an electric power system,
    the armature control unit configured to perform both of:
        (i) power generation mode control, in which the armature control unit controls supply of reactive current, as the exciting current, from the electric power system to operate the induction rotating machine as a power generator, and
        (ii) heat generation mode control, in which the armature control unit controls supply of torque current, as the exciting current, causing slip that generates load torque hindering rotation of the induction rotating machine to operate the induction rotating machine as a heat generator to increase an amount of generated heat as compared with an amount of heat generated in the power generation mode control.

2. The wind power generating system according to claim 1, wherein in the heat generation mode control, the armature control unit controls the torque current as direct current.

3. The wind power generating system according to claim 1, wherein in the heat generation mode control, the armature control unit controls the torque current as alternating current having a frequency allowing for rated torque to stalling torque.

4. The wind power generating system according to claim 1, comprising a heat insulation container that contains the induction rotating machine, wherein
    the heat medium circulating structure circulates the heat medium in the heat insulation container.

5. The wind power generating system according to claim 1, comprising a power control unit configured to control electric power to be generated by the thermal power generator, in accordance with the electric power demand of the electric power system.

* * * * *